(12) United States Patent
Kronstadt et al.

(10) Patent No.: US 11,321,797 B2
(45) Date of Patent: May 3, 2022

(54) WEARABLE WATERMARKS

(71) Applicant: KYNDRYL, INC., New York, NY (US)

(72) Inventors: Andrew S. Kronstadt, Pensacola, FL (US); Joseph Reyes, Pelham, NY (US); Bernhard Julius Klingenberg, Grover Beach, CA (US); Marci Devorah Formato, Clintondale, NY (US)

(73) Assignee: KYNDRYL, INC., New York, NY (US)

( * ) Notice: Subject to any disclaimer, the term of this patent is extended or adjusted under 35 U.S.C. 154(b) by 101 days.

(21) Appl. No.: 17/001,749

(22) Filed: Aug. 25, 2020

(65) Prior Publication Data

US 2022/0067870 A1 Mar. 3, 2022

(51) Int. Cl.
*G06K 9/00* (2022.01)
*G06T 1/00* (2006.01)
(Continued)

(52) U.S. Cl.
CPC ...... *G06T 1/0042* (2013.01); *G06K 19/06037* (2013.01); *G06T 1/0085* (2013.01);
(Continued)

(58) Field of Classification Search
CPC ..... G06T 1/0042; G06T 1/005; G06T 7/0002; G06T 2201/0065; G06T 2201/0201; G10L 25/57; G06F 21/32; G06F 21/6245; G06K 7/1417; G06K 7/1413; G06K 7/1443; H04L 63/0428; H04L 9/3247; G06Q 20/40145; G06Q 30/0601; G06Q 50/265; H04N 2201/0094; H04N 1/00854; H04N 1/32331; H04N 1/4413; H04N 21/4316;
(Continued)

(56) References Cited

U.S. PATENT DOCUMENTS 8,479,009 B2 7/2013 Bennett et al.
9,786,298 B1 10/2017 Greene
(Continued)

FOREIGN PATENT DOCUMENTS

CN 101651837 2/2010
CN 103329147 9/2013
(Continued)

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pages.
(Continued)

*Primary Examiner* — Shervin K Nakhjavan
(74) *Attorney, Agent, or Firm* — Ken Han; Andrew M. Calderon; Roberts Calderon Safran & Cole P.C.

(57) ABSTRACT

A user can wear a device which emits a visual and/or audible output. The output changes over time. A system is capable of predicting the output. Thus, the system can analyze a video and determine, based on observed output of the device, whether the video has been modified. The output can be particularly difficult for humans to modify, detect, understand, or recreate, further impeding attempts to disguise edits to the video.

20 Claims, 11 Drawing Sheets

(51) Int. Cl.
  *G06T 7/00* (2017.01)
  *G06K 19/06* (2006.01)
  *G10L 25/57* (2013.01)
(52) U.S. Cl.
  CPC ............ *G06T 7/0002* (2013.01); *G10L 25/57* (2013.01); *G06T 2201/0065* (2013.01); *G06T 2201/0201* (2013.01); *G06T 2207/10016* (2013.01)
(58) Field of Classification Search
  CPC ..... H04N 21/44008; H04N 2201/3205; H04N 2201/3252
  See application file for complete search history.

(56) References Cited

U.S. PATENT DOCUMENTS

| | | | | |
|---|---|---|---|---|
| 10,475,145 | B1* | 11/2019 | Lester | G06K 9/4671 |
| 11,210,703 | B2* | 12/2021 | Achhra | G06Q 30/0267 |
| 2004/0125983 | A1* | 7/2004 | Reed | H04N 1/32208 |
| | | | | 382/100 |
| 2004/0128512 | A1* | 7/2004 | Sharma | G06Q 20/3823 |
| | | | | 713/176 |
| 2010/0029380 | A1* | 2/2010 | Rhoads | A63F 13/10 |
| | | | | 463/29 |
| 2011/0123065 | A1* | 5/2011 | Bae | H04N 21/8358 |
| | | | | 382/100 |
| 2011/0289114 | A1* | 11/2011 | Yu | H04N 21/4331 |
| | | | | 707/769 |
| 2012/0062571 | A1* | 3/2012 | Malek | G06F 1/163 |
| | | | | 345/501 |
| 2015/0326570 | A1* | 11/2015 | Publicover | H04N 5/44504 |
| | | | | 726/4 |
| 2016/0283920 | A1 | 9/2016 | Fisher et al. | |
| 2018/0255269 | A1 | 9/2018 | Klein et al. | |
| 2019/0188433 | A1* | 6/2019 | Todescato | G06K 7/10722 |
| 2019/0294900 | A1 | 9/2019 | Li et al. | |
| 2019/0302952 | A1 | 10/2019 | Wang | |
| 2020/0068389 | A1* | 2/2020 | Rothkopf | H04W 12/63 |
| 2021/0134097 | A1* | 5/2021 | Lovelock | G07C 9/27 |
| 2021/0295381 | A1* | 9/2021 | Wackerbauer | G06Q 30/0252 |

FOREIGN PATENT DOCUMENTS

| | | |
|---|---|---|
| CN | 104079952 | 10/2014 |
| JP | 6585464 B2 | 10/2019 |
| KR | 20170098701 | 8/2017 |
| WO | 2019183914 A1 | 10/2019 |
| WO | 2019190940 A1 | 10/2019 |

OTHER PUBLICATIONS

International Search Report and Written Option of the International Searching Authority from PCT Application No. PCT/CN2021/114085 dated Nov. 23, 2021, 6 pages.

* cited by examiner

WEARABLE WATERMARKS

BACKGROUND

The present disclosure relates to authentication, and more specifically, to systems and methods for frustrating video editing attempts and aiding detection of video editing.

The field of video editing has expanded rapidly for decades, and methodologies and associated technologies continue to progress. Computer-aided editing (such as "deepfakes," leveraging advancements in deep learning to modify a video more convincingly) has contributed to the development of the field. Video manipulation has advanced to the point where even expertly trained users may struggle to detect changes made to a video.

Videos are generally built as a series of "frames," wherein a frame is a static image. Displaying the frames quickly enough may result in the appearance of motion; the higher the framerate (number of frames per unit time, typically measured in "frames per second" or "fps"), the greater the effect. For example, many films are filmed and played at a framerate of 24 fps, while some videos or interactive programs may run at framerates of 30 fps, 60 fps, 144 fps, 240 fps, or above.

SUMMARY

Some embodiments of the present disclosure can be illustrated as a method. The method includes detecting a wearable watermark in a video. The method further includes monitoring an output of the wearable watermark. The method further includes determining, based on a discrepancy between the predicted output and the monitored output of the wearable watermark, that the video has been edited. The method further includes indicating, based on the determining, that the video has been edited.

Some embodiments of the present disclosure can also be illustrated as a computer program product comprising a computer readable storage medium having program instructions embodied therewith, the program instructions executable by a computer to cause the computer to perform the method discussed above.

Some embodiments of the present disclosure can be illustrated as a system. The system may comprise memory and a CPU. The CPU may be configured to perform the method discussed above.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure. Features and advantages of various embodiments of the claimed subject matter will become apparent as the following Detailed Description proceeds, and upon reference to the drawings, in which like numerals indicate like parts, and in which:

Figure 1:
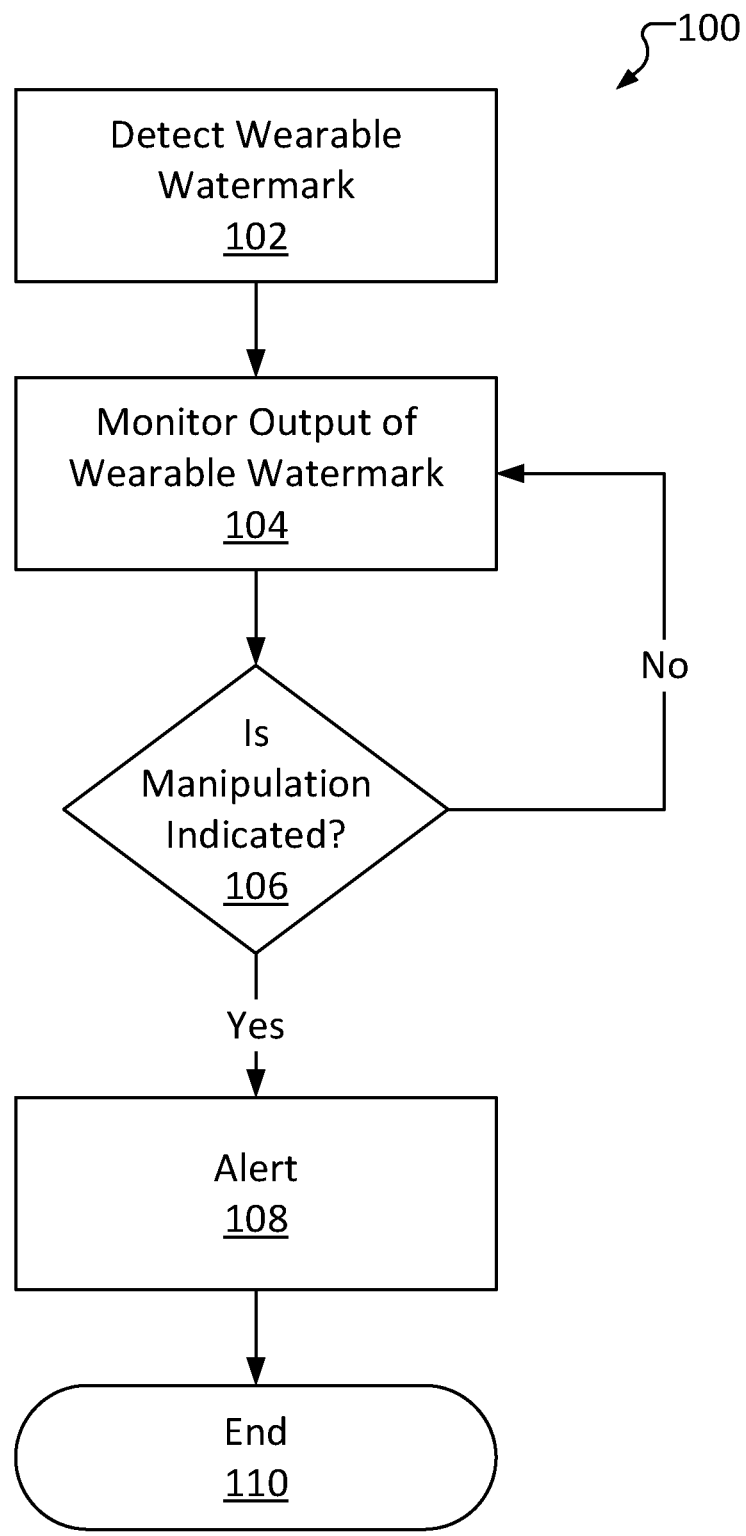
FIG. 1 illustrates a high-level video editing detection method utilizing a wearable watermark consistent with several embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to systems and methods to determine whether a video has been tampered or otherwise edited. More particular aspects relate to a system to detect a wearable watermark, monitor output of the wearable watermark, determine whether the output deviates from an expected output and, if it does, alert that the video has likely been edited.

Combined with the tendency of videos to "go viral" and spread exponentially, edited videos may be responsible for accelerated spread of misinformation. Even satirical or otherwise-humor-focused editing can spread far beyond a creator's initial intent and end up being consumed and taken at face value by users worldwide.

Throughout this disclosure, reference is made to "videos." The term "video" is used herein to refer to a combination of both visual data and audio data. However, many embodiments of the present disclosure may function based solely on visual (e.g., without audio) or audio (e.g., without visual) data, as will be appreciated by one of ordinary skill in the art.

Throughout this disclosure, reference is made to one or more "wearable watermarks." As used herein, a "wearable watermark" is a device to be worn by a user during recording (for example, of a video). Wearable watermarks may include a display and a speaker configured to output information (for example, in a continuous or periodic fashion). Wearable watermarks are devices configured to perform operations enabling detection of video manipulation. As a simplified example, a wearable watermark may include a display that steadily iterates through letters of the alphabet (such as, for example, displaying "A" for a period of time, then displaying "B" for a similar period of time, then "C," etc.). Thus, if an editor rearranges frames of the video file, the displayed letters may appear out of order. In some embodiments, the wearable watermark displays computer-readable codes that humans may have difficulty deciphering (such as, for example, visual displays similar to QR codes). Such computer-readable codes may be more difficult for an editor to replicate appropriately. This may beneficially increase the security of the watermark; a malicious actor who cannot determine what a falsified watermark should look like would have difficulty falsifying the watermark. In addition, the codes may appear to change unpredictably to those not in possession of secret information associated with the wearable watermark (as a simple example, a serial number of the wearable watermark may be utilized as a seed for a random number generator, whose output may determine how the displayed code changes over time). Thus, only users with access to this secret information may accurately predict what the wearable watermark should be displaying at a given moment in time, and therefore validate whether the wearable watermark is indicating tampering. In some embodiments, multiple wearable watermarks may be implemented and/or monitored.

As another example, a wearable watermark may emit a sound that predictably changes in pitch, wherein the sound may be at a frequency beyond the range of human hearing but within the range of a typical microphone. Thus, an audiovisual recording of a wearer may record the emitted sound, though a viewer or editor may not notice it outside of performing more intricate audio analysis. This sound, changing similarly to the visual code identified above, may further frustrate a would-be editor, advantageously making tampering easier to detect.

In some embodiments, a wearable watermark includes one or more sensors such as a global positioning system (GPS) receiver, accelerometer(s), gyroscope(s), etc. If authenticity of a video purporting to depict the watermark session is challenged, this sensor data may advantageously provide evidence to enable a determination, as described in further detail below.

FIG. 1 illustrates a high-level video editing detection method 100 utilizing a wearable watermark consistent with several embodiments of the present disclosure. Method 100 may be performed by, for example, a computing system (such as system 1100 of FIG. 11) as a means of analyzing a video to determine whether the video has been tampered with or otherwise edited. In some embodiments, method 100 may be performed in real time (for example, as a video is played). In some embodiments, method 100 may be performed as analysis on a stored video file.

Method 100 includes detecting a wearable watermark at operation 102. Operation 102 may include, for example, analyzing one or more frames of a video and/or analyzing an audio track associated with a video to determine whether a wearable watermark is captured in the video. In some embodiments, a system performing method 100 may be provided with data to enable the system to detect the wearable watermark, such as one or more patterns that the wearable watermark may display. In some embodiments, a wearable watermark may display a computer-readable code (such as, for example, a QR code) which, when read by the system performing method 100, may result in the system identifying the wearable watermark. In some embodiments, a system performing method 100 may be directly informed that a wearable watermark is in the video in question, in which case operation 102 may include locating the wearable watermark.

Method 100 further includes monitoring output of the wearable watermark at operation 104. Operation 104 may include, for example, recognizing and/or recording one or more images displayed by the wearable watermark (which, for example, may include computer-readable code). Operation 104 may further include analyzing an audio track to identify an audio output of the wearable watermark. Video and/or audio output may be monitored over time.

Method 100 further includes identifying whether manipulation and/or tampering of the video is indicated at operation 106. Operation 106 may include, for example, determining whether the monitored output of the wearable watermark matches predicted output (as will be discussed in further detail below with reference to FIG. 2), determining whether the wearable watermark has been omitted (e.g., cropped out, "covered"), etc.

If no manipulation is detected (106 "No"), method 100 includes continuing to monitor output of the wearable watermark at operation 104 and searching for signs of manipulation at operation 106. If manipulation is indicated (106 "Yes"), method 100 further includes alerting that the video file is suspected to be manipulated at operation 108. Operation 108 may include, for example, displaying a notification, emitting a sound, transmitting a notification to a remote server to log the manipulated video, halting playback of the video, etc. Method 100 then ends at operation 110. In some embodiments, method 100 may further continue to monitor wearable watermark output to search for additional evidence of manipulation.

In embodiments wherein method 100 is being performed upon a stored video file, operations 104 and 106 may be performed until the end of the video file is reached (possibly interrupting if a manipulation is detected). In embodiments wherein method 100 is being performed in real time (as in, during recording or playback of the video), operations 104 and 106 may be performed until the video ends (similarly possibly interrupting if a manipulation is detected).

Figure 2:
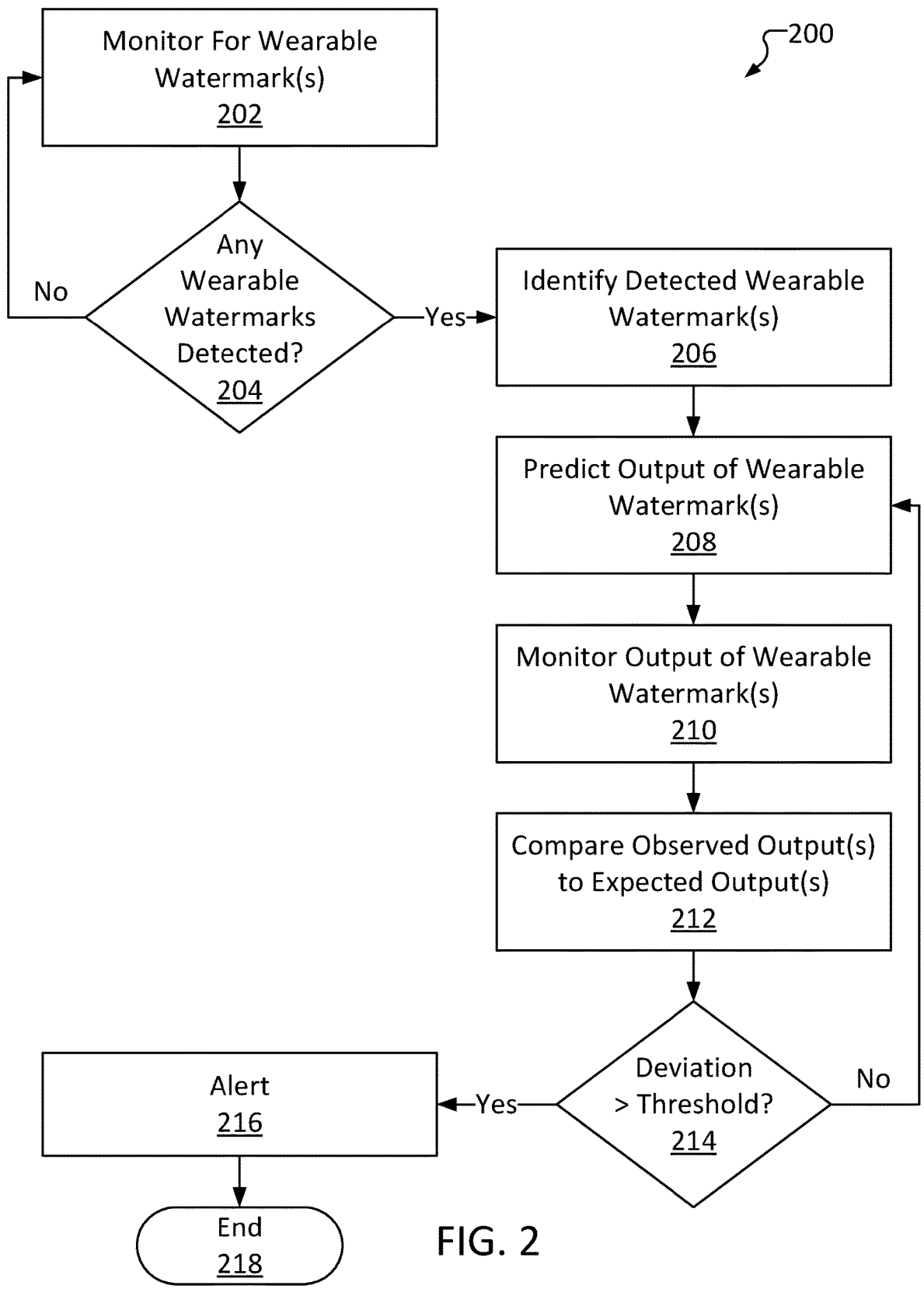
FIG. 2 illustrates a wearable-watermark-output discrepancy evaluation method consistent with several embodiments of the present disclosure.

FIG. 2 illustrates a wearable-watermark-output discrepancy evaluation method 200 consistent with several embodiments of the present disclosure. Method 200 may be performed by, for example, a computing system (such as system 1100 of FIG. 11) as a means of analyzing a video to determine whether the video has been tampered with or otherwise edited. In some embodiments, method 200 may be performed in real time (for example, as a video is played and/or streamed). In some embodiments, method 200 may be performed on a stored video file.

Method 200 includes monitoring for wearable watermarks at operation 202. Operation 202 may include, for example, performing image recognition/analysis on a frame of a video to determine if the image includes a wearable watermark. Wearable watermarks may be identified based on, for example, searching for one or more computer-readable codes in the frame. Operation 202 may further include analyzing one or more audio tracks included in the video to determine if an audio signal associated with a wearable watermark is included in the video.

Method 200 further includes determining whether a wearable watermark has been detected at operation 204. Operation 204 may be based on the results of the monitoring performed in operation 202; if no wearable watermark was detected (204 "No"), method 200 may return to operation 202 to continue monitoring for a wearable watermark.

If a wearable watermark is detected (204 "Yes"), method 200 includes identifying the detected wearable watermark at operation 206. "Identifying," as used herein, is distinguished from "detecting" in that "detecting" refers to determining whether the video includes any wearable watermark(s) at all, whereas "identifying" a detected wearable watermark at operation 206 refers to determining an identity of a specific wearable watermark that has been detected. As different wearable watermarks may produce different outputs, identification of a detected wearable watermark may be an important step in order to accurately predict the output of the wearable watermark (and thus determine whether the video has been manipulated). In some embodiments, a system performing method 200 may have been provided with an identity of wearable watermark(s) included in the video in advance. Thus, in some embodiments, operation 206 may include confirming the provided identity (such as by comparing predicted output to expected output, as described below), while in some embodiments operation 206 may include simply assuming that the detected wearable watermark is the preidentified wearable watermark.

Method 200 further includes predicting an output of the identified wearable watermark(s) at operation 208. Operation 208 may include, for example, leveraging a current time code or a current frame number of the video in combination with the identity of the wearable watermark in order to determine what image(s) the wearable watermark should be displaying/what sound(s) the wearable watermark should be emitting.

In some embodiments, a system performing method 200 may be in contact with an internet-based server managing the wearable watermark. For example, the wearable watermark may have communicated to the server that a recording session was being initiated, including a time when the recording was to start. In some embodiments, operation 208 may include receiving predicted outputs of the wearable watermark from the cloud-based server.

Method 200 further includes monitoring an output of the wearable watermark at operation 210. Operation 210 may include, for example, recognizing and/or recording one or more images displayed by the wearable watermark (which, for example, may include computer-readable code). Operation 210 may further include analyzing an audio track to identify an audio output of the wearable watermark. Operation 210 may further include identifying a time/frame number at the point at which the output is being monitored and/or recorded.

In some embodiments, operation 210 may further include determining whether the output of the wearable watermark is visibly modified; for example, image artifacts, etc., can be used to determine whether the image of the output of the wearable watermark has been altered, as would be understood by one of ordinary skill in the art. If the output is visibly modified, this may constitute an indication that the video has been tampered with (such that method 200 may proceed directly to alerting at operation 216, skipping operations 212 and 214).

Method 200 further includes comparing observed outputs of the wearable watermark to predicted outputs at operation 212. Operation 212 may include, for example, determining whether an image displayed by the wearable watermark (as monitored at operation 210) matches an expected image (such as that predicted at operation 208). Operation 212 may further include comparing predicted audio to expected audio. In some embodiments, an audio signal emitted by the wearable watermark may essentially be utilized as a checksum by encrypting a time signal encoded as a sound pattern. For example, in some embodiments operation 210 may include recording an audio signal (e.g., in the form of a dataset); operation 212 may then include taking the sum of values in the dataset and comparing the sum to an expected value to determine whether the audio signal is valid.

Method 200 further includes determining whether any discrepancy/deviation between the predicted and detected outputs exceeds a predetermined threshold at operation 214. The determination of operation 214 may be based on the comparison made at operation 212. For example, if an image displayed by a wearable watermark does not match an expected image, operation 214 may include determining whether the detected image is "close" to the expected image. The image may be close temporally (for example, the detected image may have been displayed one or two frames "early" relative to the expected image) or visually (for example, the detected image may be partially obscured, preventing a perfect match, but is a partial match). These kinds of deviations may be compared to one or more preset thresholds to determine whether the deviations indicate that the video has been manipulated. If no manipulation is detected (214 "No") method 200 proceeds to continue predicting/monitoring/comparing at operations 208-214.

If the deviation indicates that the video has been manipulated (214 "Yes"), method 200 further includes outputting an alert at operation 216. Operation 216 may include, for example, displaying a notification, emitting a sound, transmitting a notification to a remote server to log the manipulated video, halting playback of the video, etc. Method 200 then ends at operation 218. In some embodiments, rather than ending, method 200 may further continue to predicting/monitoring/comparing at operations 208-214 to search for additional evidence of manipulation.

In some embodiments, wearable watermarks may utilize a standardized pattern of codes. While this may reduce security, it may enable detection of manipulation without needing to identify a specific wearable watermark.

Figure 3:
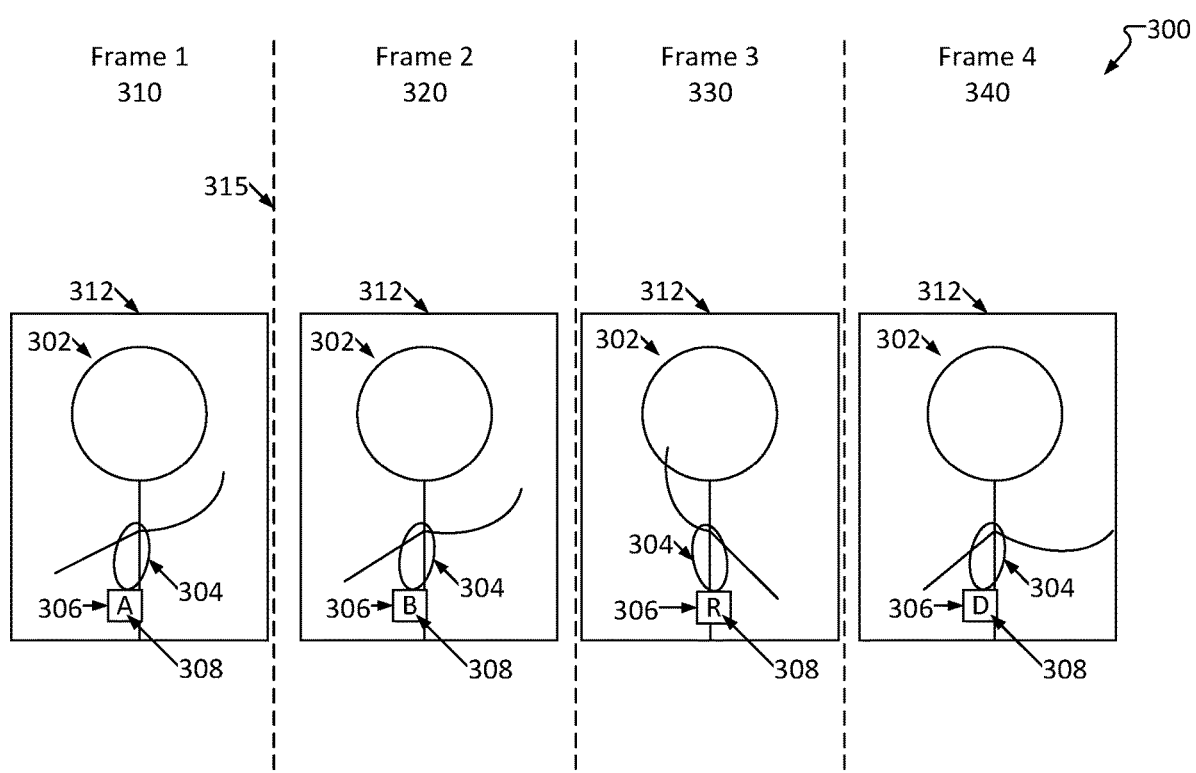
FIG. 3 illustrates frames of an example video depicting a user, wherein the frames have been tampered with (via simple rearranging) in a way that a wearable watermark may assist in identifying, in accordance with several embodiments of the present disclosure.

FIG. 3 illustrates frames of an example video 300 depicting a user 302, wherein the frames have been tampered with (via simple rearranging) in a way that a wearable watermark 306 may assist in identifying, in accordance with several embodiments of the present disclosure. Video 300 includes at least four frames: frame 1 310, frame 2 320, frame 3 330 and frame 4 340. Video 300 may also include one or more additional frames (not shown in FIG. 3) before frame 1 310 and/or after frame 4 340. The different frames are distinguished by the dashed lines (such as line 315) as well as frame boundaries 312.

Frames, as described herein, are numbered according to the order in which they are displayed during playback of a video file. Notably, frame 3 330, while being the third frame displayed during playback of video 300, shows evidence of manipulation, as will be described in further detail below.

As can be seen in FIG. 3, a user 302 is visible in each frame. User 302 is depicted as wearing a wearable watermark 306 by means of a necklace 304. In some embodiments, wearable watermark 306 may be affixed to user 302 via other means such as, for example, a lapel pin, an earring, a headband, eyeglasses, embedded within clothing (possibly including "smart" clothing), etc.

Wearable watermark 306 is displaying an output 308. While FIG. 3 depicts output 308 as a single character (e.g., a capital "A" in frame 1 310), output 308 could take a variety of different forms, as would be understood by one of ordinary skill in the art. For example, output 308 could be a computer-readable code, an image, etc.

Output 308 may change over time. In the example depicted in FIG. 3, output 308 is a single letter, and advances a single letter according to the order of the English alphabet every frame. For example, frame 1 310 depicts the first letter "A," frame 2 320 depicts the second letter "B," and so on. A system monitoring outputs of wearable watermark 306 may anticipate output 308 to be "C" in the frame following frame 2 320. However, the frames of video 300 depicted in FIG. 3 have been manipulated; for example, the frames may have been rearranged to put a much later frame in the position of frame 3 330. While the pose of user 302 makes this readily apparent in FIG. 3, this is merely for the sake of explanation. As can be seen in FIG. 3, output 308 is "R" in frame 3 330. The fact that this is not the case in frame 3 330 may indicate that video 300 has been manipulated. Frame 4 340 "resumes" normal playback, depicting output 308 as "D" as would be expected according to this pattern of wearable watermark outputs.

Figure 4:
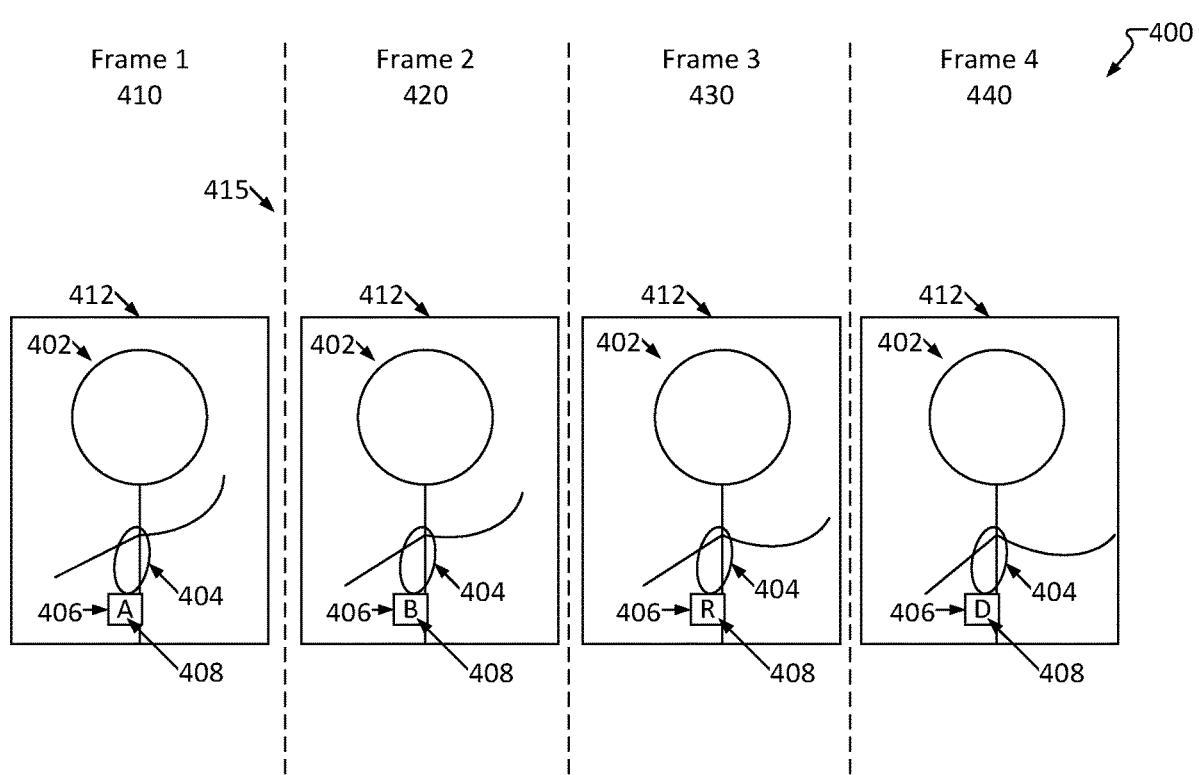
FIG. 4 illustrates frames of an example video depicting a user, wherein the frames have been tampered with (via rearranging in combination with image editing) in a way that a wearable watermark may assist in identifying, in accordance with several embodiments of the present disclosure.

FIG. 4 illustrates frames of an example video 400 depicting a user 402, wherein the frames have been tampered with (via rearranging in combination with image editing) in a way that a wearable watermark 406 may assist in identifying, in accordance with several embodiments of the present disclosure. Video 400 includes at least four frames: frame 1 410, frame 2 420, frame 3 430 and frame 4 440. Video 400 may also include one or more additional frames (not shown in FIG. 4) before frame 1 410 and/or after frame 4 440. The different frames are distinguished by the dashed lines (such as line 415) as well as frame boundaries 412. As can be seen in FIG. 4, a user 402 is visible in each frame. User 402 is depicted as wearing a wearable watermark 406 by means of a necklace 404.

FIG. 4 may be considered similar to FIG. 3 with the exception that the tampered frame 3 430 has been edited to further disguise the tampering; user 402's pose is not a giveaway that frame 3 430 is not the correct frame that should follow frame 2 420 in video 400. However, as can be seen in frame 3 430, output 408 is again "R," enabling a system monitoring wearable watermark 406 to still detect that video 400 has been tampered with (particularly frame 3 430). In embodiments wherein output 408 is a more complicated computer-readable code, a malicious actor may struggle to edit frame 3 430 to successfully depict what output 408 "should" be. Further, editing output 408 may result in various aftereffects such as image artifacts, etc., which a system monitoring wearable watermark 406 may be specifically searching for. In addition, even if a malicious actor successfully modified output 408, an audio checksum may still enable a system to detect manipulation.

Figure 5:
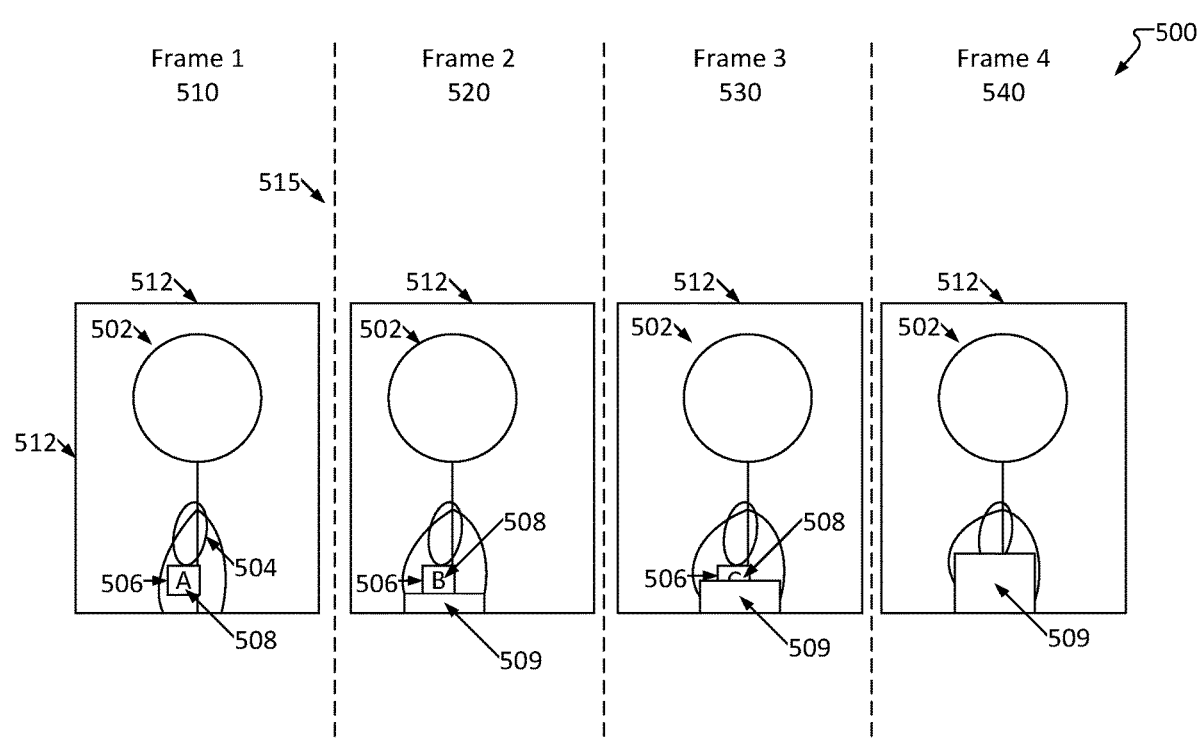
FIG. 5 illustrates frames of an example video depicting a use case wherein a user obscures part or all of a wearable watermark, in accordance with several embodiments of the present disclosure.

FIG. 5 illustrates frames of an example video 500 depicting a use case wherein a user 502 obscures part or all of a wearable watermark 506, in accordance with several embodiments of the present disclosure. Video 500 includes at least four frames: frame 1 510, frame 2 520, frame 3 530 and frame 4 540. Video 500 may also include one or more additional frames (not shown in FIG. 5) before frame 1 510 and/or after frame 4 540. The different frames are distinguished by the dashed lines (such as line 515) as well as frame boundaries 512. As can be seen in FIG. 5, a user 502 is visible in each frame. User 502 is depicted as wearing a wearable watermark 506 by means of a necklace 504.

Notably, video 500 of FIG. 5 has not been manipulated. However, without special care, a system reviewing or monitoring video 500 may trigger a "false positive" alert. This is because the user 502 may inadvertently (or intentionally) obscure wearable watermark 506 such that display output 508 is no longer visible to a camera capturing frames of video 500. This may occur, for example, as a result of picking up a piece of paper 509 (such as if user 502 were reading from paper 509). Other possible obstructions are of course also possible and fully contemplated herein (e.g., user 502 performing a gesture which briefly obstructs wearable watermark 506, a pet passing by, a camera recording video 500 being bumped or falling over, etc.).

In some embodiments, loss of sight of the output 508 of wearable watermark 506 may indicate an alert that video 500 has been tampered with. Other "benign" reasons for obfuscation or loss of vision of output 508 are also considered; some video files may include multiple camera angles, one or more of which do not have line of sight to output 508. One common example is a standard dialogue recording technique often referred to as "shot—reverse shot." Such a practice is common in both films as well as interviews. Such a recording depicts two speakers who are facing one another, and is captured utilizing two cameras, one behind each speaker. Each camera records a currently speaking user from behind the non-speaking user, keeping both users in frame but keeping a speaker's face in view. Were one such user wearing a wearable watermark such as watermark 506, display output 508 may not be visible whenever the recording "cuts" to a second camera. As another example, a camera's automatic (or manual) focus may result in the display output 508 temporarily becoming unrecognizable. However, in these "benign" situations, the frames are still in the appropriate order. Thus, an audio checksum based on an audio output of wearable watermark 506 may still "pass" (indicating that the recorded audio aligns with expected audio), and once display output 508 is visible again, output 508 will still align with the expected output (barring any unrelated problems).

In view of the above, in some embodiments, a brief (e.g., fewer than three frames, fewer than three seconds, etc.) loss of detection of an output display such as 508 may not result in an alarm, particularly if an audio checksum still indicates that the audio has not been manipulated. This may enable a wearable watermark monitoring system to be more robust in view of possible benign losses of visibility as described above. A length of time considered "brief" may be defined (such as by user 502) on a per-watermark or even per-session basis.

In some use cases, anticipated manipulation may be solely visual, leaving audio data unmodified. Thus, in some embodiments, a "zero-tolerance" policy may apply; any loss of recognizability of output display 508 may result in an alert that the video is suspected of being tampered. This may be advantageous as some users may have particularly strict authentication requirements (for example, if user 502 is a politician and frames are part of video 500 of politician 502 giving an important speech).

Note that many commonplace video editing practices may be impacted by a wearable watermark as implemented in some embodiments, even including some practices that may generally be considered "harmless". For example, a "vlogger" creating a video discussing a user 502 may insert one or more "clips" from video 500 in the vlogger's video to provide context to viewers. However, a system monitoring for wearable watermarks may detect watermark 506 in the vlogger's video but determine that the displayed output 508 does not match the time and/or frame count of the video, inferring that the frames including output 508 are not being played at the expected time (for example, frame 1 510 may be played as a 350th frame of the vlogger's video, frame 2 520 may be played as a 351st frame of the vlogger's video, etc.). While this inference may be technically accurate, alerting and/or flagging the vlogger's video as "tampered" or otherwise manipulated may be considered an overreaction by some viewers.

In view of the above, in some embodiments, a wearable watermark monitoring system may check whether any frames including a wearable watermark are played in a sequence (or "clip") of a minimum length. If the clip exceeds the minimum length, the clip may be authenticated by comparing display output 508 with an audio checksum. As an example, even if a five second clip from later in video 500 was inserted earlier on (indicating that video 500 has been manipulated), a system may determine that the five second clip itself is at least unmodified (a "continuous clip"). In some embodiments, so long as a clip is of a minimum length and is verifiably a continuous clip, detection of a wearable watermark may not result in an alert. A minimum length may be enforced in order to prevent one or more excessively short (e.g., less than 1 second) clips from being played back or interwoven (which may indicate an attempt to misrepresent the content of video 500). This may enable commentary or "vlogger" videos to utilize clips of video 500 while still reducing the risk of the clips being taken out of context. This minimum length may be adjusted by, for example, user 502.

As a clarifying example, user 502 may be concerned that a vlogger might insert a three second clip of video 500 (such as a clip depicting user 502 making a statement) into a vlog and provide commentary about user 502 to an audience based on the clip (where the surrounding ten seconds of video 500 may provide important context about the statement made by user 502 in the three second clip). However, user 502 may still want to allow clips of video 500 to be depicted for a variety of reasons, such as to increase reach and/or publicity. Thus, embodiments enforcing a "minimum clip length" as discussed above may advantageously constitute a compromise between these interests; if user 502 enforces a minimum clip length of thirty seconds, then the vlogger's video may be flagged as manipulated/possibly misleading, but other videos including the clip and the surrounding context may be permitted.

Figure 6:
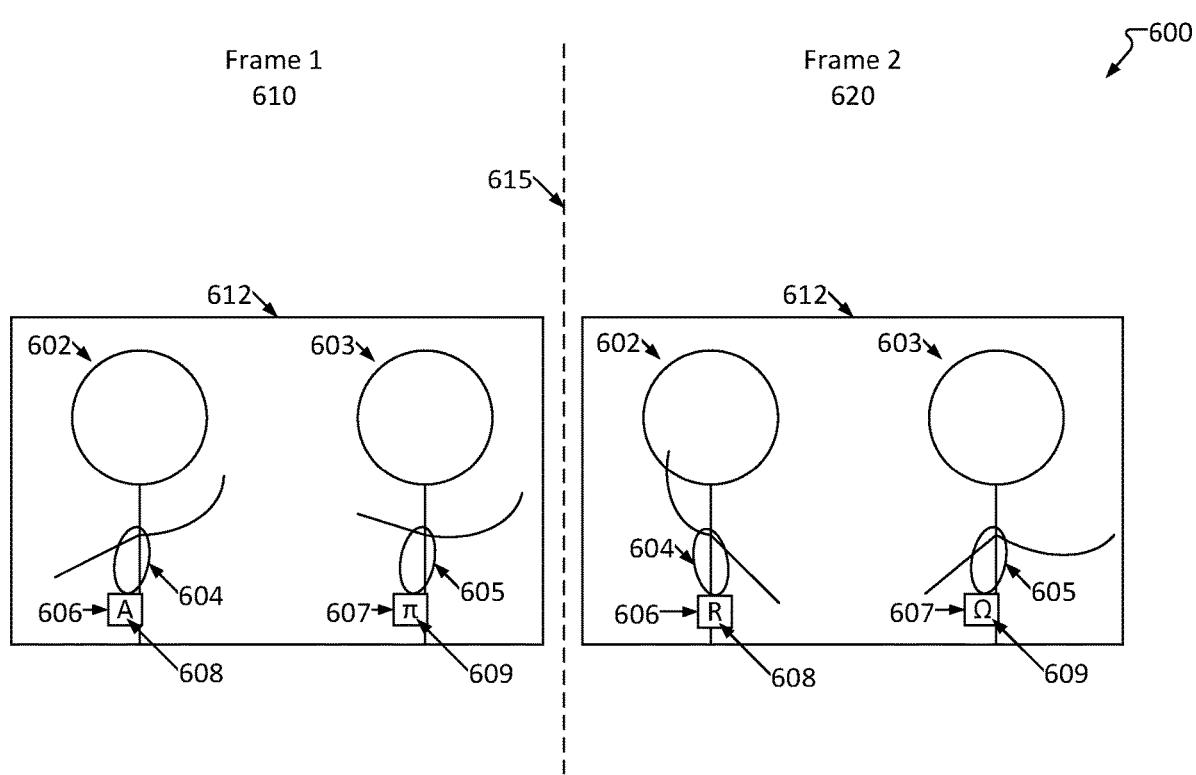
FIG. 6 illustrates frames of an example video depicting multiple users, each wearing a wearable watermark, wherein the frames have been tampered with (via simple rearranging) in a way that the wearable watermarks may assist in identifying, in accordance with several embodiments of the present disclosure.

FIG. 6 illustrates frames of an example video 600 depicting multiple users (602 and 603), each wearing a wearable watermark (606 and 607, respectively), wherein the frames have been tampered with (via simple rearranging) in a way that the wearable watermarks 606 and 607 may assist in identifying, in accordance with several embodiments of the present disclosure. Video 600 includes at least two frames: frame 1 610 and frame 2 620. Video 600 may also include one or more additional frames (not shown in FIG. 6) before frame 1 610 and/or after frame 2 620. The different frames are distinguished by dashed line 615 as well as frame boundaries 612. As can be seen in FIG. 6, a first user 602 and a second user 603 are both visible in each frame. User 602 is depicted as wearing a wearable watermark 606 by means of a necklace 604. User 603 is depicted as wearing a wearable watermark 607 by means of a necklace 605.

Wearable watermark 606 is displaying an output 608, and wearable watermark 607 is displaying an output 609. While FIG. 6 depicts outputs 608 and 609 as single characters (e.g., output 608 is a capital "A" and output 609 is a Greek "pi" (π) in frame 1 610), outputs 608 and 609 could take a variety of different forms, as would be understood by one of ordinary skill in the art. For example, output 608 could be a computer-readable code, output 609 could be an image, etc.

Notably, outputs 608 and 609 may be different from one another, even within the same frame. Further, outputs 608 and 609 may have entirely different formats; as shown in FIG. 6, wearable watermark 606's output 608 is an English letter in both frames 610 and 620, while wearable watermark 607's output 609 is a Greek letter in both frames 610 and 620. This is depicted in FIG. 6 as an illustrative example to show that different wearable watermarks may depict different images/codes at a given time and, further, may function fundamentally differently. For this reason, a system monitoring a wearable watermark may need to identify the watermark (such as at operation 206 of method 200, with reference to FIG. 2) in order to accurately predict what the output of the watermark should be.

Figure 7:
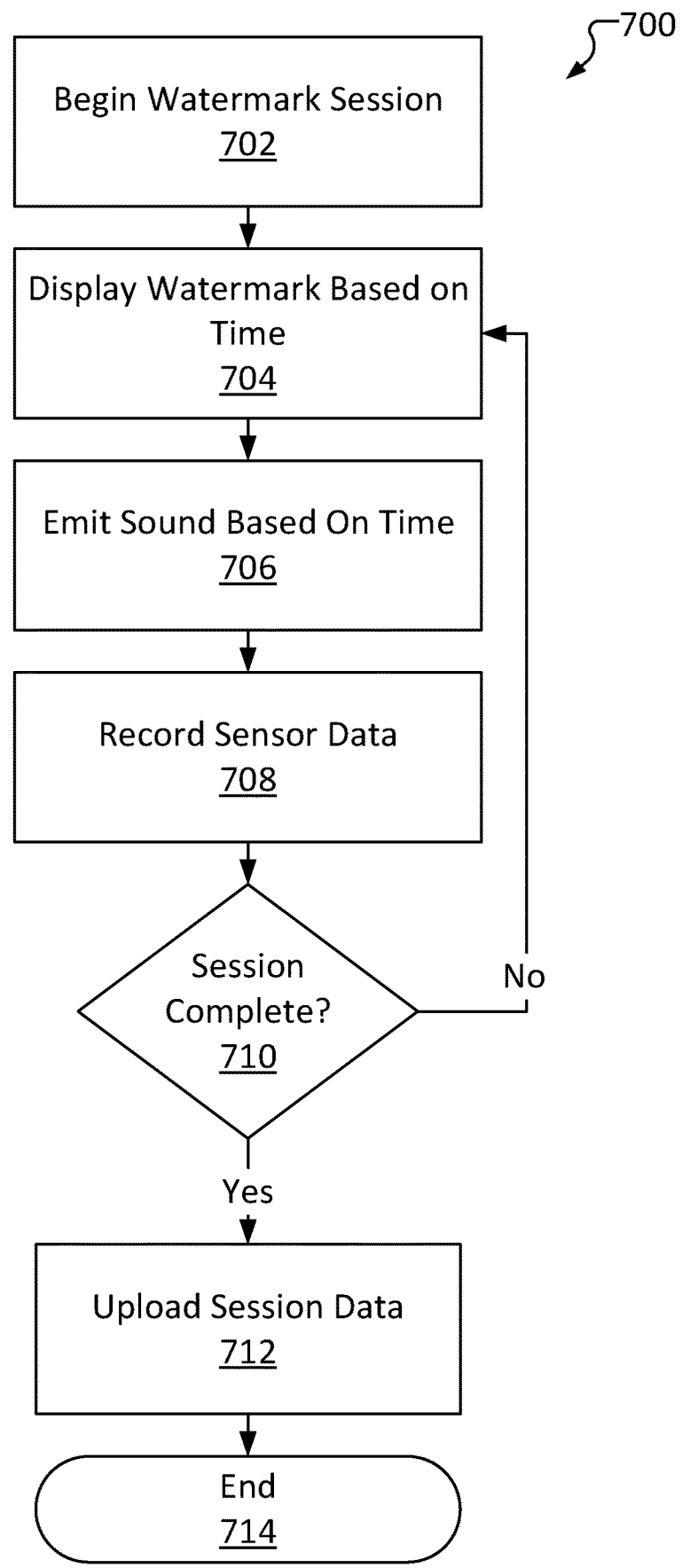
FIG. 7 illustrates a wearable watermark operation method consistent with several embodiments of the present disclosure.

FIG. 7 illustrates a wearable watermark operation method 700 consistent with several embodiments of the present disclosure. Method 700 may be performed by a device such as a wearable watermark worn by a user during a recording session. Method 700 may be initiated by a user (e.g., a user wearing the wearable watermark). For example, a user may submit a request to a remote computing service (such as a cloud-based service), indicating that the user wishes to initiate a wearable watermark recording session. The remote computing service may respond by generating and transmitting a one-time encryption key to the wearable watermark. This one-time encryption key may be used by the wearable watermark as a seed for generating output. In some embodiments, the one-time encryption key may only be generated and/or transmitted if one or more conditions are met. These conditions may include, for example, a successful verification that the user has an active subscription to a service, a successful verification that the wearable watermark is not currently reported lost or stolen, a successful result of an internal tampering test, etc.

Method 700 includes beginning a watermark session at operation 702. Operation 702 may include, for example, utilizing an encryption key (such as one received from a cloud-based service) to initialize a pattern of codes to display, sounds to emit, etc. Operation 702 may further include starting a timer.

Method 700 further includes displaying a watermark at operation 704. Operation 704 may include, for example, causing a display of the wearable watermark to depict a computer-readable code. Operation 704 may further include displaying a human-readable message, such as a timer, This may advantageously enable even human viewers to quickly determine whether the video is being viewed out-of-order. Operation 704 may include identifying the code to display based on, for example, a time (such as an elapsed time read from a timer started in operation 702, a generic clock, etc.). A computer-readable code that is identified in operation 704 may be further based on a key, such as a one-time encryption key received from a cloud-based service.

A watermark depicted at operation 704 may be updated to a new image. For example, the watermark may be changed every second, every 60th of a second, whenever a current (or elapsed) time matches an entry on a predefined list (whose entries are not necessarily evenly distributed), based on a user input (for example, whenever a user presses a button), etc.

Method 700 further includes emitting sound based on a current time at operation 706. Operation 706 may include, for example, emitting a sound pulse encoding various metadata (current recording time, pulse count, data based on the displayed image, etc.) at regular intervals. For example, in some embodiments, operation 706 may include causing a sound to be generated and emitted every half second. In some embodiments, operation 706 may include continuously emitting a sound, wherein a frequency and/or amplitude of the sound is based at least on a current time. In some embodiments, operation 706 may include emitting a sound at a frequency above the upper limit of typical human hearing (for example, above a frequency of 20 kiloHertz (kHz), 30 kHz, etc.). In some embodiments, operation 706 may include emitting a sound at a frequency within a frequency response of a microphone (a "frequency response" of a microphone refers to a range of frequencies that the microphone is capable of detecting and recording). For example, the wearable watermark performing method 700 may be provided with information regarding the recording session, which may include a frequency response of one or more microphones. Operation 706 may leverage this information in order to emit pulses at frequencies that humans are unlikely to hear but are still within range of the microphone. If the microphone's frequency response is within both high and low bounds of assumed human hearing, operation 706 may include emitting pulses at a relatively lower frequency (such as, for example, 40 Hz).

Method 700 further includes recording sensor data at operation 708. Operation 708 may include, for example, recording data from one or more sensors of the wearable watermark. For example, the wearable watermark may include a microphone, a GPS receiver, one or more gyroscopes, accelerometers, etc. Operation 708 may include recording data from one or more of these sensors to a local storage system during the watermark session. If authenticity of a video purporting to depict the watermark session is challenged, this data may advantageously provide evidence to enable a determination. For example, if displayed and audio watermark information appears to be accurate but a video is nonetheless alleged to be faked, events from the video may be correlated with the recorded data (such as a wearer of the wearable watermark adjusting themselves in their seat being reflected in accelerometer and/or gyroscope data).

In addition, GPS data may assist in validation and/or identifying faked videos that attempt to digitally "transplant" the wearable watermark. For example, a malicious actor may attempt to insert a wearable watermark into a faked video by copying images and sounds of a wearable watermark in an authentic video. If an authentic video depicts a user wearing a wearable watermark holding an interview in the United States, the actor may attempt to duplicate the wearable watermark to falsely claim that a faked video of a user giving a speech in Europe is authentic. In such a situation, recorded GPS data may reflect that the watermarked session associated with the output images and sounds depicted in the "Europe" video actually took place in the United States, thus suggesting that the fake Europe video is indeed inauthentic.

Recorded audio (from a microphone) may be used to debunk an attempt to fake a wearer's speech. While audio emitted at operation 706 may also assist in this, operation 708 may still include recording audio data as an extra layer of redundancy.

Method 700 further includes determining whether the session is complete at operation 710. Operation 710 may include, for example, identifying whether a user has depressed an "off" button or otherwise manually ended the watermark session. In some embodiments, operation 710 may include monitoring a timer, wherein a watermark session may only last for a predetermined (default or user-set) length of time. If such a time limit has expired (determined based on a timer started at operation 702), the session may automatically end (710 "Yes").

If the session is not complete (710 "No"), method 700 further includes continuing to perform watermarking operations 704, 706 and 708 (updating the display at operation 704 and the sound emitted at operation 706 based on, for example, elapsed time) until the session is ended (710 "Yes"). Once the session ends, method 700 proceeds to upload session data at operation 712. Operation 712 may include, for example, uploading some or all of the data recorded at operation 708. In some embodiments, operation 712 may include uploading one or all images displayed during the various iterations of operation 704. Similarly, in some embodiments, operation 712 may include uploading data describing the sound(s) emitted as a result of the various iterations of operation 706. Operation 712 may include uploading this data to one or more internet servers, such as a cloud-based server. The cloud-based server may, upon receiving this data, store the data in a cloud storage container, analyze the data in order to create "fingerprints" of the session, and checksum the data and log it into a blockchain. Once the data upload is complete, method 700 ends at operation 714.

Method 700 may be initiated by a user submitting a request to a remote computing service. The request may include, for example, metadata about the recording session the user wishes to initiate. This metadata may include a date, a time, a duration, a location, etc. In some embodiments, the one-time encryption key may be generated, at least in part, based on the metadata. The session metadata may be useful, for example, for monitoring a live broadcast for manipulation or editing. In some embodiments, the sensor data recorded at operation 708 may be uploaded periodically or streamed to a remote computing service, which may compare the sensor data to the metadata. The metadata may also include one or more security settings, such as tolerances/thresholds, minimum clip length (enforcing a minimum continuous segment of the video at a time, as discussed in further detail below), etc.

In some embodiments, the audio checksum may enable a system to determine that a wearable watermark was present at the recording. If the wearable watermark is not visible for a duration during which the audio output is detected (for example, ten seconds, the entire length of the video, the duration of a single frame, etc.), the system may indicate that the video has been modified.

Figure 8:
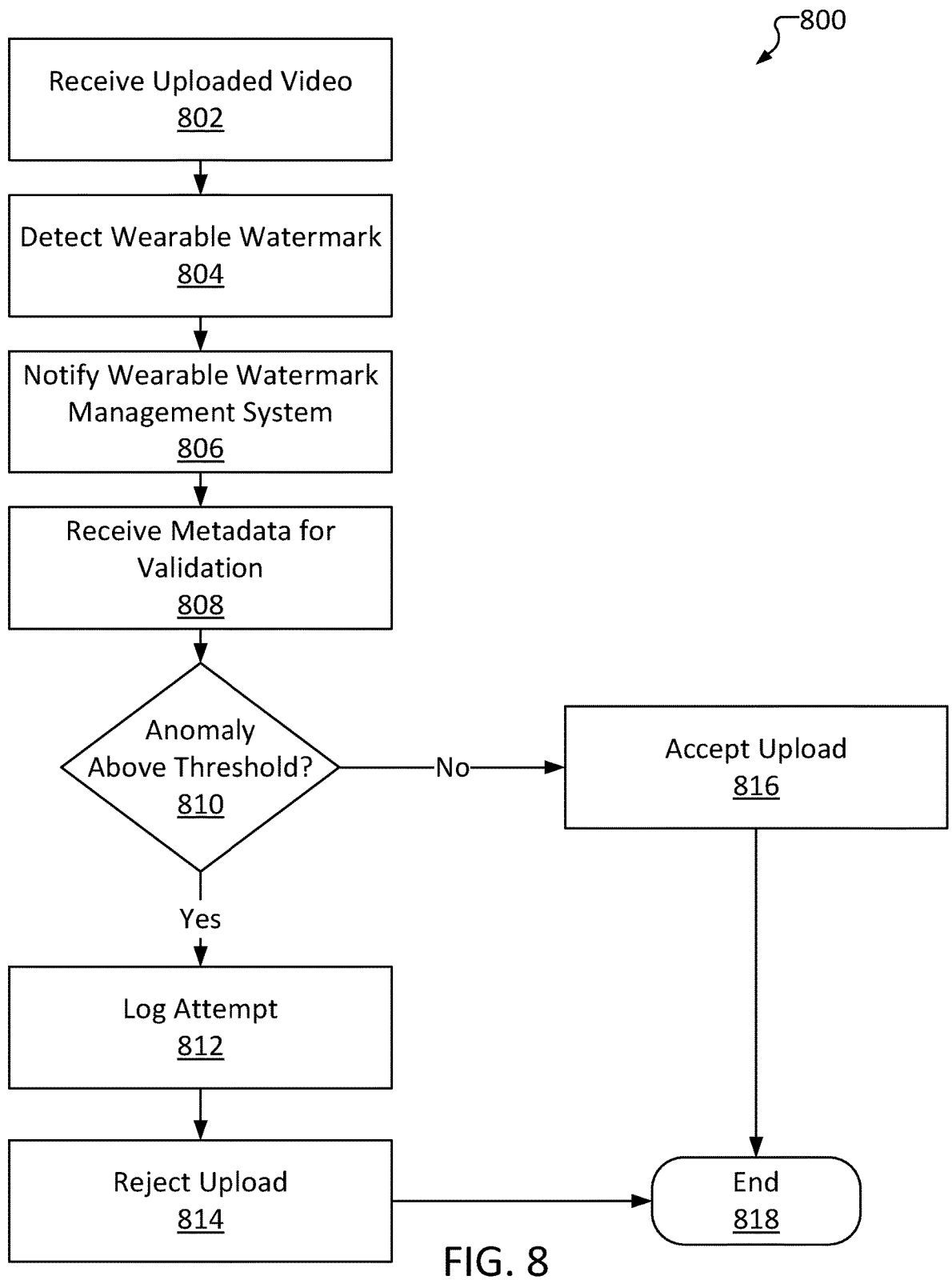
FIG. 8 illustrates a tampered video upload detection method consistent with several embodiments of the present disclosure.

FIG. 8 illustrates a tampered video upload detection method 800 consistent with several embodiments of the present disclosure. Method 800 may be performed by, for example, an online video content provider/distributor. Method 800 includes receiving an uploaded video at operation 802. Operation 802 may include, for example, detecting an attempt to upload a video, or detecting that an upload of a video has completed.

Method 800 further includes detecting a wearable watermark at operation 804. Operation 804 may include, for example, performing image analysis on frames of the video file to determine whether a wearable watermark appears in one or more frames of the video. Operation 804 may include listening for sounds emitted by the wearable watermark (such as by performing audio analysis on an audio track of the video to determine whether audio emitted by a wearable watermark is present on the audio track). Operation 804 may be performed in a manner similar to operation 102 of method 100 with reference to FIG. 1, operation 204 of method 200 with reference to FIG. 2, etc.

Method 800 further includes notifying a wearable watermark management system at operation 806. Operation 806 may include, for example, transmitting a notification via the internet to a cloud-based system, the notification indicating that a system performing method 800 has encountered a video file containing a wearable watermark. The cloud-based system may maintain a blockchain or other database of (hashed and/or encrypted) wearable watermark session data, and thus a system performing method 800 may request some of this data in order to determine validity of the uploaded video in question.

The notification sent in operation 806 may include some data that may be used by the cloud-based system in order to determine a wearable watermark session that the uploaded video appears to be depicting. This data may include, for example, one or more frames of the video in which the wearable watermark is detected, audio data including watermark audio pulses, etc.

Method 800 further includes receiving metadata for validation at operation 808. Operation 808 may include, for example, receiving data that a system performing method 800 may leverage to identify the wearable watermark, decode an output of the wearable watermark and/or predict the output of the wearable watermark. With this data, the system performing method 800 may validate the output of the wearable watermark as observed in the video.

Method 800 further includes determining whether a watermark output anomaly is above a threshold at operation 810. Operation 810 may include, for example, predicting output of the wearable watermark (based on the data received at operation 808), monitoring output of the wearable watermark (based on the video file), and comparing the predicted output to the monitored output to determine an anomaly rating or discrepancy level. In some embodiments, the predicted output may be based on a predetermined list or sequence of watermark outputs.

If a magnitude of the anomaly (e.g., a ratio of mismatched predictions to correct predictions) is above a predetermined threshold (such as, for example, 0.05) (810 "Yes"), method 800 proceeds to log the upload attempt of an inauthentic video at operation 812. Operation 812 may include, for example, transmitting a notification to the cloud-based server of the time of the attempt, identity of the wearable watermark and/or session, etc. Method 800 then includes rejecting the upload at operation 814. Operation 814 may include, for example, deleting the uploaded video file, refusing to allow access to the uploaded video file, etc. Operation 814 may further include providing an uploading user with a notification of the rejected upload (and, in some embodiments, an explanation of why). Method 800 then ends at operation 818.

If a magnitude of the anomaly is within tolerable levels (810 "No"), method 800 proceeds to accept upload of the video file at operation 816. Operation 816 may include, for example, publishing the uploaded video (subject to terms between the uploading user and the system performing method 800), storing the uploaded video in long-term storage, etc. Method 800 may then end at operation 818.

As method 800 may, depending upon the video, result in rejecting the upload, waiting for the upload to complete before proceeding may consume significant computational resources. However, method 800 requires analyzing the video; in order to do this without receiving the uploaded video, a system may request permission to scan one or more files on a user's device. If permission is granted, the system performing method 800 may cause the user's device to perform the analysis on the video file prior to upload. Results of the analysis may be encrypted and uploaded to the system. This way, should a video be rejected, this determination can be reached without uploading the entire video file. Many users may not be comfortable with privacy implications of this, and a proprietor of a system performing method 800 may not be comfortable with publicity associated with such "invasive" operations. Therefore, in some embodiments, operation 802 may include waiting to receive the entire video file.

In some embodiments, a wearable watermark may be disguised so as to be relatively difficult for humans to notice. For example, one wearable watermark may comprise a colored lapel pin whose output is in the form of subtle color changes; a wearable watermark detection system may be able to detect and monitor the pin based on the color changes, while the changes themselves may be subtle or slow enough to be difficult for humans to notice.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
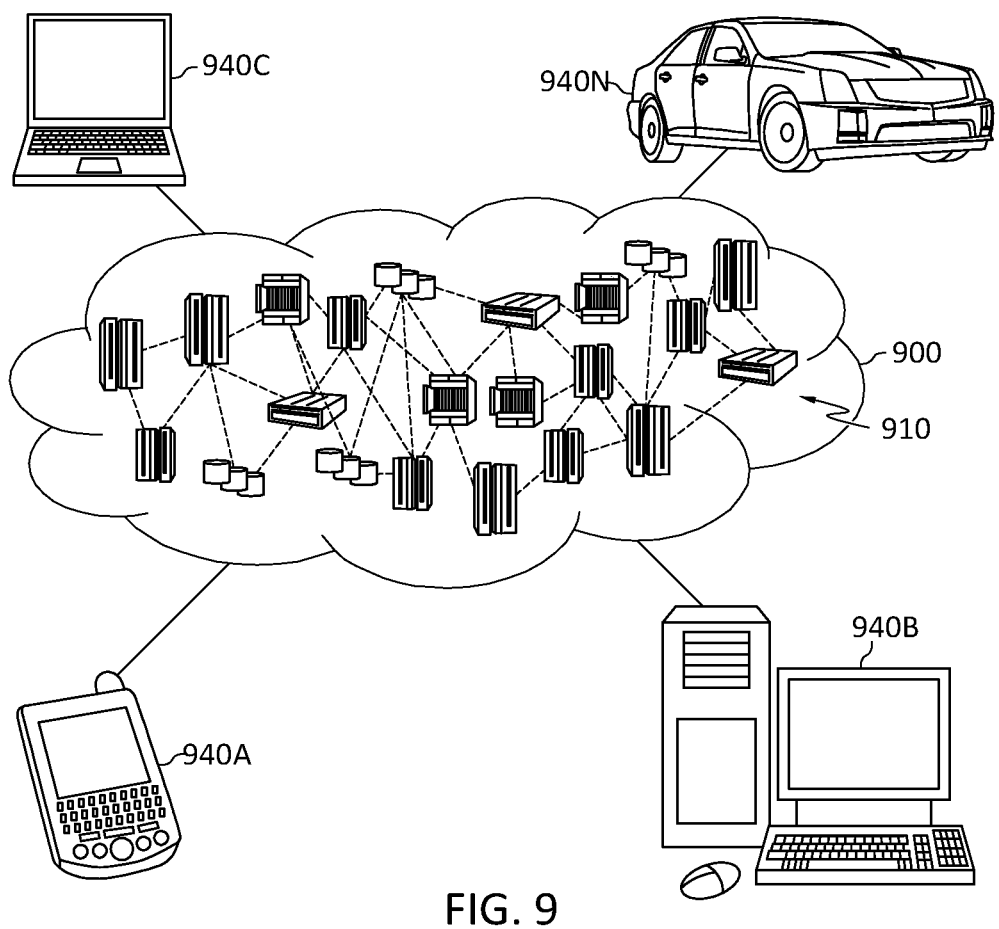
FIG. 9 depicts a cloud computing environment according to an embodiment of the present disclosure.

Referring now to FIG. 9, illustrative cloud computing environment 900 is depicted. As shown, cloud computing environment 900 comprises one or more cloud computing nodes 910 with which local computing devices used by cloud consumers, such as, for example, personal digital assistant (PDA) or cellular telephone 940A, desktop computer 940B, laptop computer 940C, and/or automobile computer system 940N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 900 to offer infrastructure, platforms and/or software as services for which a cloud consumer does not need to maintain resources on a local computing device. It is understood that the types of computing devices 940A-N shown in FIG. 9 are intended to be illustrative only and that computing nodes 910 and cloud computing environment 900 can communicate with any type of computerized device over any type of network and/or network addressable connection (e.g., using a web browser).

Figure 10:
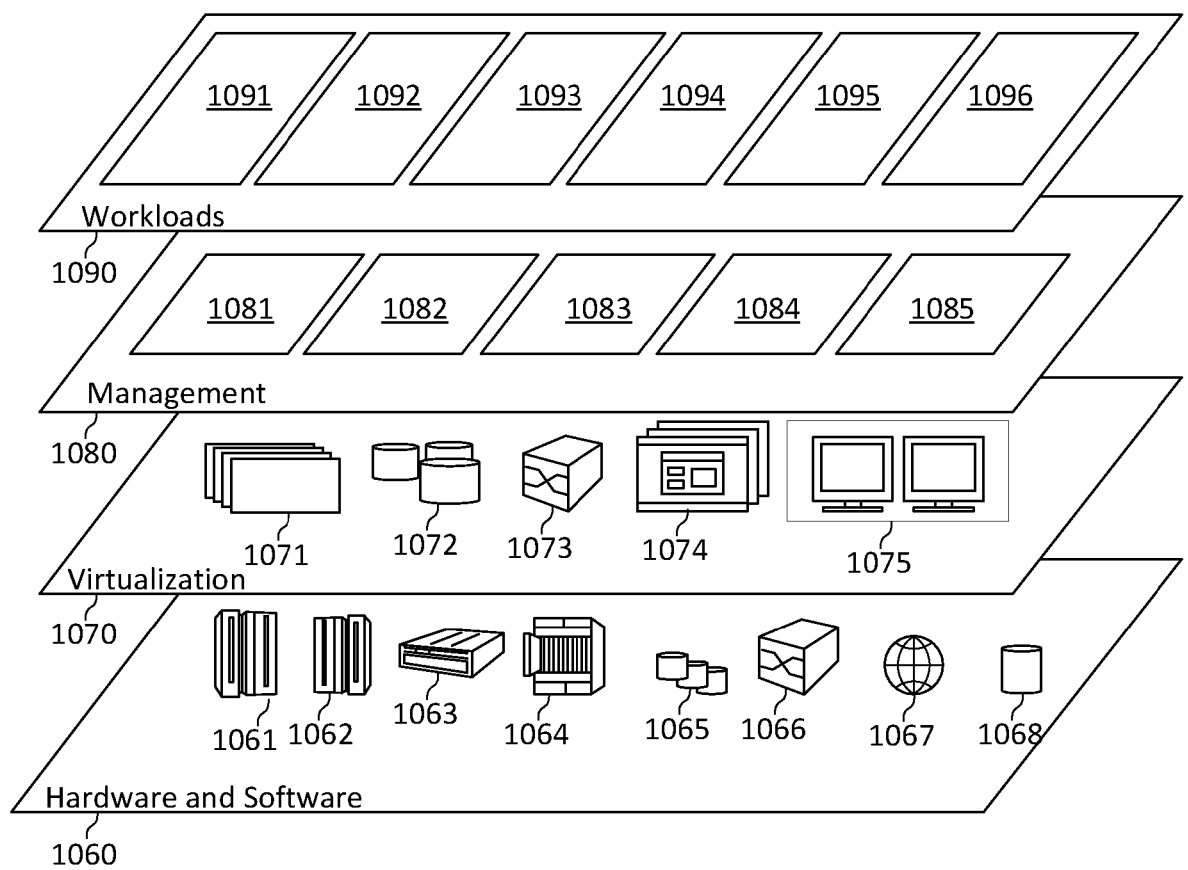
FIG. 10 depicts abstraction model layers according to an embodiment of the present disclosure.

Referring now to FIG. 10, a set of functional abstraction layers provided by cloud computing environment 900 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and wearable watermark detection and monitoring 1096.

Figure 11:
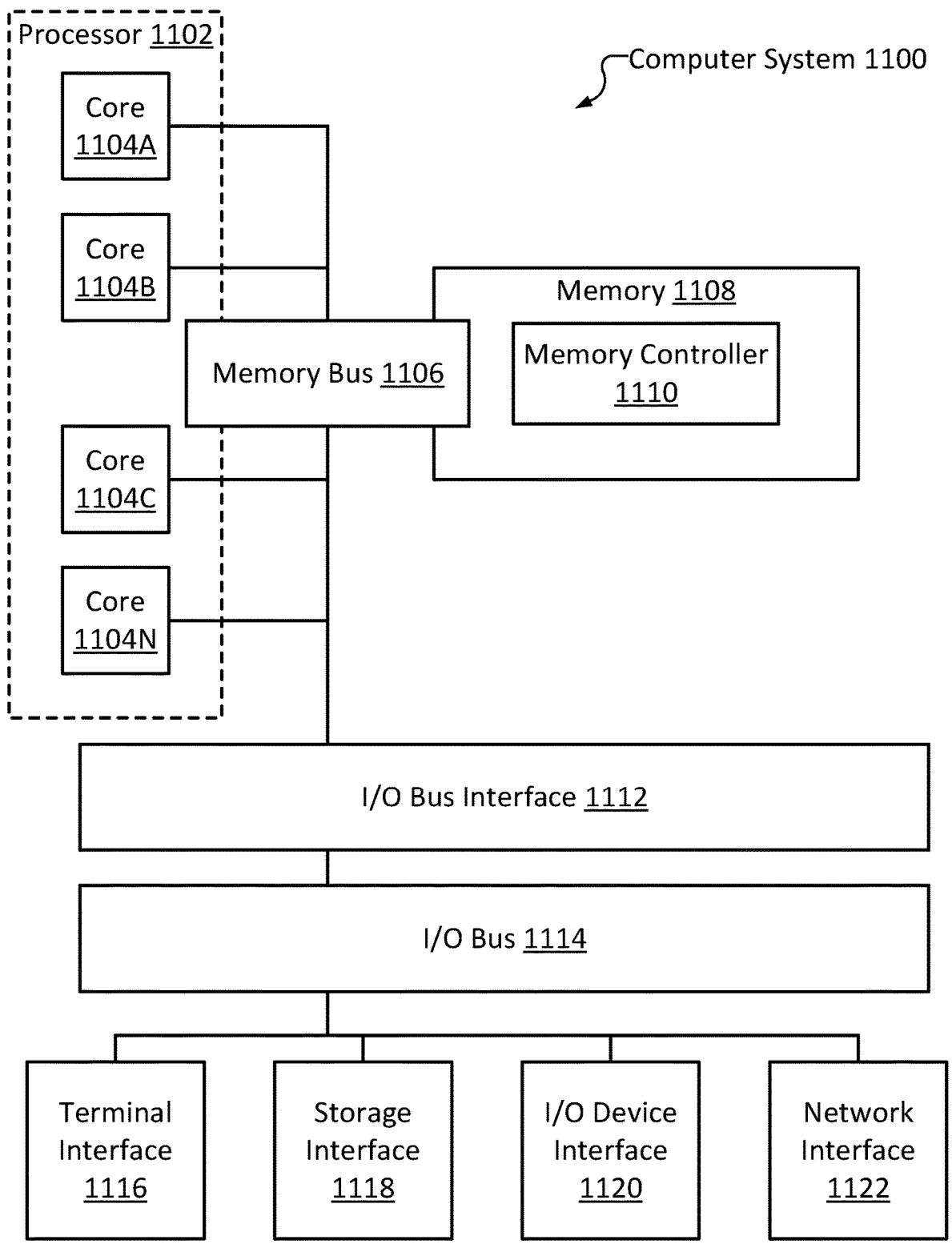
FIG. 11 illustrates a high-level block diagram of an example computer system that may be used in implementing embodiments of the present disclosure.

Referring now to FIG. 11, shown is a high-level block diagram of an example computer system 1100 that may be configured to perform various aspects of the present disclosure, including, for example, methods 100, 200, 700 and 800. The example computer system 1100 may be used in implementing one or more of the methods or modules, and any related functions or operations, described herein (e.g., using one or more processor circuits or computer processors of the computer), in accordance with embodiments of the present disclosure. In some embodiments, the major components of the computer system 1100 may comprise one or more CPUs 1102, a memory subsystem 1108, a terminal interface 1116, a storage interface 1118, an I/O (Input/Output) device interface 1120, and a network interface 1122, all of which may be communicatively coupled, directly or indirectly, for inter-component communication via a memory bus 1106, an I/O bus 1114, and an I/O bus interface unit 1112.

The computer system 1100 may contain one or more general-purpose programmable central processing units (CPUs) 1102, some or all of which may include one or more cores 1104A, 1104B, 1104C, and 1104D, herein generically referred to as the CPU 1102. In some embodiments, the computer system 1100 may contain multiple processors typical of a relatively large system; however, in other embodiments the computer system 1100 may alternatively be a single CPU system. Each CPU 1102 may execute instructions stored in the memory subsystem 1108 on a CPU core 1104 and may comprise one or more levels of on-board cache.

In some embodiments, the memory subsystem 1108 may comprise a random-access semiconductor memory, storage device, or storage medium (either volatile or non-volatile) for storing data and programs. In some embodiments, the memory subsystem 1108 may represent the entire virtual memory of the computer system 1100 and may also include the virtual memory of other computer systems coupled to the computer system 1100 or connected via a network. The memory subsystem 1108 may be conceptually a single monolithic entity, but, in some embodiments, the memory subsystem 1108 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 804 may contain elements for control and flow of memory used by the CPU 1102. This may include a memory controller 1110.

Although the memory bus 1106 is shown in FIG. 11 as a single bus structure providing a direct communication path among the CPU 1102, the memory subsystem 1108, and the I/O bus interface 1112, the memory bus 1106 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 1112 and the I/O bus 1114 are shown as single respective units, the computer system 1100 may, in some embodiments, contain multiple I/O bus interface units 1112, multiple I/O buses 1114, or both. Further, while multiple I/O interface units are shown, which separate the I/O bus 1114 from various communications paths running to the various I/O devices, in other embodiments some or all of the I/O devices may be connected directly to one or more system I/O buses.

In some embodiments, the computer system 1100 may be a multi-user mainframe computer system, a single-user system, or a server computer or similar device that has little or no direct user interface but receives requests from other computer systems (clients). Further, in some embodiments, the computer system 1100 may be implemented as a desktop computer, portable computer, laptop or notebook computer, tablet computer, pocket computer, telephone, smart phone, mobile device, or any other appropriate type of electronic device.

It is noted that FIG. 11 is intended to depict the representative major components of an exemplary computer system 1100. In some embodiments, however, individual components may have greater or lesser complexity than as represented in FIG. 11, components other than or in addition to those shown in FIG. 11 may be present, and the number, type, and configuration of such components may vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method, comprising:
   detecting a wearable watermark in a video;
   monitoring an output of the wearable watermark;
   calculating a predicted output of the wearable watermark;
   determining, based on a discrepancy between the predicted output and the monitored output of the wearable watermark, that the video has been edited; and
   indicating, based on the determining, that the video has been edited.

2. The method of claim 1, further comprising identifying the wearable watermark, the identifying including:
   transmitting a notification to a wearable watermark manager, the notification including:
      an indication that the wearable watermark has been detected in the video; and
      first metadata of the video; and
   receiving a response from the wearable watermark manager, the response including an identification of the wearable watermark.

3. The method of claim 2, wherein the calculating is based on the identifying.

4. The method of claim 1, wherein the output includes both a visual output and an audio output.

5. The method of claim 4, wherein the visual output includes a computer-readable code.

6. The method of claim 4, wherein the calculating includes calculating a checksum based on the audio output.

7. The method of claim 1, wherein the wearable watermark is worn by a user.

8. A system, comprising:
   a central processing unit (CPU) including one or more CPU cores, the CPU configured to:
      detect a wearable watermark in a video;
      monitor an output of the wearable watermark;
      calculate a predicted output of the wearable watermark;
      determine, based on a discrepancy between the predicted output and the monitored output of the wearable watermark, that the video has been edited; and
      indicate, based on the determining, that the video has been edited.

9. The system of claim 8, wherein the CPU is further configured to identify the wearable watermark, the identifying including:
   transmitting a notification to a wearable watermark manager, the notification including:
      an indication that the wearable watermark has been detected in the video; and
      first metadata of the video; and receiving a response from the wearable watermark manager, the response including an identification of the wearable watermark.

10. The system of claim 9, wherein the calculating is based on the identifying.

11. The system of claim 8, wherein the output includes both a visual output and an audio output.

12. The system of claim 11, wherein the visual output includes a computer-readable code.

13. The system of claim 11, wherein the calculating includes calculating a checksum based on the audio output.

14. The system of claim 8, wherein the wearable watermark is worn by a user.

15. A computer program product, the computer program product comprising a computer readable storage medium having program instructions embodied therewith, the program instructions executable by a computer to cause the computer to:
  detect a wearable watermark in a video;
  monitor an output of the wearable watermark;
  calculate a predicted output of the wearable watermark;
  determine, based on a discrepancy between the predicted output and the monitored output of the wearable watermark, that the video has been edited; and
  indicate, based on the determining, that the video has been edited.

16. The computer program product of claim 15, wherein the instructions further cause the computer to identify the wearable watermark, the identifying including:
  transmitting a notification to a wearable watermark manager, the notification including:
    an indication that the wearable watermark has been detected in the video; and
    first metadata of the video; and
  receiving a response from the wearable watermark manager, the response including an identification of the wearable watermark.

17. The computer program product of claim 16, wherein the calculating is based on the identifying.

18. The computer program product of claim 15, wherein the output includes both a visual output and an audio output.

19. The computer program product of claim 18, wherein the visual output includes a computer-readable code.

20. The computer program product of claim 15, wherein the wearable watermark is worn by a user.

* * * * *